United States Patent
Jones et al.

(10) Patent No.: US 11,091,255 B2
(45) Date of Patent: Aug. 17, 2021

(54) LEAD-LAG DAMPERS AND ASSEMBLIES FOR AN ARTICULATED ROTOR AND METHODS FOR OPERATION

(71) Applicant: LORD Corporation, Cary, NC (US)

(72) Inventors: Peter Jones, Erie, PA (US); Brian McGill, Erie, PA (US)

(73) Assignee: LORD Corporation, Cary, NC (US)

( * ) Notice: Subject to any disclaimer, the term of this patent is extended or adjusted under 35 U.S.C. 154(b) by 458 days.

(21) Appl. No.: 15/310,893

(22) PCT Filed: Jun. 11, 2015

(86) PCT No.: PCT/US2015/035338
§ 371 (c)(1),
(2) Date: Nov. 14, 2016

(87) PCT Pub. No.: WO2015/191858
PCT Pub. Date: Dec. 17, 2015

(65) Prior Publication Data
US 2017/0081024 A1    Mar. 23, 2017

Related U.S. Application Data

(60) Provisional application No. 62/010,714, filed on Jun. 11, 2014.

(51) Int. Cl.
*B64C 27/51* (2006.01)
*F16F 1/40* (2006.01)
*B64C 27/37* (2006.01)

(52) U.S. Cl.
CPC .............. *B64C 27/51* (2013.01); *B64C 27/37* (2013.01); *F16F 1/40* (2013.01)

(58) Field of Classification Search
CPC ......... B64C 27/51; B64C 27/35; B64C 27/37; F16F 1/406; F16F 1/403
See application file for complete search history.

(56) References Cited

U.S. PATENT DOCUMENTS 3,731,913 A * 5/1973 Hirst ...................... B61F 5/305
267/294
3,758,230 A 9/1973 Potter
(Continued)

FOREIGN PATENT DOCUMENTS

CN      202 358 301       8/2012
DE      21 39 337         10/1972
(Continued)

OTHER PUBLICATIONS

Written Opinion and International Search Report for Application No. PCT/US2015/035338 dated Sep. 7, 2015.

*Primary Examiner* — David Hamaoui
*Assistant Examiner* — John S Hunter, Jr.
(74) *Attorney, Agent, or Firm* — Jenkins, Wilson, Taylor & Hunt, P.A.

(57) ABSTRACT

Dampers (100), assemblies, and methods are provided for lead-lag damping for an articulated rotor and includes a lead-lag damper (100) having a first end connector (102) configured to be coupled to a rotor hub (H), a second end connector (104) configured to be coupled to one of a plurality of rotor blades (B), and a body portion (110) coupled to the first end connector (102) and to the second end connector (104). The body portion (110) includes one or more elastomeric material layers (120) arranged in a lengthwise direction between the first end connector (102) and the second end connector (104), with each of the elastomeric material layers (120) having a substantially chevron-shaped profile in a crosswise direction.

12 Claims, 4 Drawing Sheets

(56) References Cited

U.S. PATENT DOCUMENTS

| | | | | |
|---|---|---|---|---|
| 3,762,834 A | * | 10/1973 | Bourquardez | B64C 27/33 |
| | | | | 416/134 A |
| 5,449,152 A | | 9/1995 | Byrnes et al. | |
| 8,029,371 B2 | * | 10/2011 | Stamps | B64C 27/35 |
| | | | | 416/134 A |
| 2002/0154940 A1 | | 10/2002 | Georges | |

FOREIGN PATENT DOCUMENTS

| | | |
|---|---|---|
| EP | 3 154 854 B1 | 11/2018 |
| FR | 2 929 675 | 10/2009 |

\* cited by examiner

LEAD-LAG DAMPERS AND ASSEMBLIES FOR AN ARTICULATED ROTOR AND METHODS FOR OPERATION

CROSS-REFERENCE TO RELATED APPLICATION

The instant application claims the benefit of U.S. Provisional Patent Application Ser. No. 62/010,714, filed Jun. 11, 2014, the disclosure of which is incorporated herein by reference in its entirety.

TECHNICAL FIELD

The subject matter disclosed herein relates generally to the design and operation of an articulated rotor. More particularly, the subject matter disclosed herein relates to the design and operation of a lead-lag damper on an articulated rotor.

BACKGROUND

Helicopters must overcome complex aerodynamic forces in order to attain stable flight. One of those hurdles occurs in forward flight where the forward speed of the helicopter increases the speed of the advancing blade of the rotor and decreases the speed of the retreating blade of the rotor. Thus, as the main rotor spins, the advancing blade has a much higher effective speed than the retreating one. All other factors being equal, the effective speed of the blade determines the lift generated by it. If the system were fully rigid, the lift generated by a helicopter would have exceptional dissymmetry, as the advancing blade would generate much more lift than the retreating blade. Off center lift would greatly complicate and even prevent the flying of the aircraft. One of the routes taken to address this problem is a so called "flapping hinge" which allows for movement by each of the blades of the rotor in the vertical direction. This movement changes the angle of attack of the blade, and thus equalizes lift over the path the blade travels.

This solution often generates another problem, however, as the changing angle of the blades changes the effective radius of the blade (i.e., the perpendicular distance from the axis of rotation to the end of the blade), which can thereby alter the speed the blade is travelling as dictated by the conservation of angular momentum. Thus, the rising blade experiences a forward pull, or lead, relative to the motion of the rotor head, while the falling blade experiences a backwards pull, or lag, relative to the motion of the rotor head. This motion can be accommodated in a fully articulated blade through a hinge that allows some forward and rear motion of the blade separate from the rotor head rotation. The movement on the hinge can be limited by means of a damper connecting the hub to the rotor. The same problem exists in tail rotors, which are used to counteract the torque the main rotor enacts on the body of the helicopter, and similar methods of counteracting the problem are employed.

Previous dampers used for this purpose were hydraulic or involved a layered elastomer in a cylindrical shape. Hydraulic dampers are costly to maintain and underperform when compared to elastomeric dampers, while conventional elastomeric dampers fail to provide a good way to inspect the integrity of the elastomer over the course of the component lifetime without destroying the damper. Furthermore, the cylindrical shape of conventional damper configurations are generally limited to constructions of two layers due to precompression requirements, and this configuration limits the shape factor of the damper, which makes carrying centrifugal loading more detrimental to the elastomer. Thus, there is a need for high performance yet comparatively more cost-effective rotor dampers that can be more easily inspected.

SUMMARY

In accordance with this disclosure, dampers, assemblies and methods are provided for lead-lag damping for an articulated rotor.

In one aspect, a lead-lag damper for an articulated helicopter rotor is provided, the lead-lag damper comprising a first end connector, a second end connector and a body portion. The first end connector is configured to couple to either a rotor hub or to one of a plurality of rotor blades. The second end connect is configured to couple to either one of the plurality of rotor blades or to the rotor hub, whichever is opposite of the coupled first end connector. The body portion is coupled to the first end connector and to the second end connector, the body portion comprising one or more elastomeric material layers arranged in a lengthwise direction between the first end connector and the second end connector, each of the elastomeric material layers having a substantially chevron-shaped profile in a crosswise direction.

In another aspect, a helicopter rotor assembly is provided, the helicopter rotor assembly comprising a rotor hub, one or more rotor blades hingedly coupled to the rotor hub, and a lead-lag damper connected between the rotor hub and one of the one or more rotor blades. The lead-lag damper comprises a first end connector, a second end connector and a body portion. The first end connector is coupled to either the rotor hub or to one of the plurality of rotor blades. The second end connector is coupled to either one of the one or more rotor blades or to the rotor hub, whichever is oppositely connected from the first end connector. The body portion is coupled to the first end connector and to the second end connector, the body portion comprises one or more elastomeric material layers arranged in a lengthwise direction between the first end connector and the second end connector, each of the elastomeric material layers having a substantially chevron-shaped profile in a crosswise direction.

In yet another aspect, a method for controlling lead-lag motion of an articulated rotor is provided. The method comprises:
 a. providing a helicopter rotor assembly of the articulated rotor, the helicopter rotor assembly comprising a rotor hub, at least one or more rotor blades hingedly coupled to the rotor hub, and a lead-lag damper connected between the rotor hub;
 b. coupling either a first end connector or a second end connector of the lead-lag damper to the rotor hub;
 c. coupling either the second end connector or the first end connector of the lead-lag damper, whichever of the first end connector or second end connector is not already coupled, to one of the plurality of rotor blades hingedly coupled to the rotor hub; and
 d. rotating the helicopter rotor assembly such that a first rotor blade leads relative to the rotor hub and a second rotor blade lags relative to the rotor hub, thereby controlling the lead-lag motion of the articulated rotor.

In yet another aspect, a method for controlling lead-lag motion of an articulated rotor is provided. The method comprises:
 a. providing a helicopter rotor assembly of the articulated rotor, the helicopter rotor assembly comprising a rotor hub, at least two or more rotor blades hingedly coupled to the rotor hub, and a lead-lag damper connected between two of the rotor blades;

b. coupling either a first end connector or a second end connector of the lead-lag damper to a first rotor blade;

c. coupling either the second end connector or the first end connector of the lead-lag damper, whichever of the first end connector or second end connector is not already coupled, to one of a second rotor blades; and d. rotating the helicopter rotor assembly such that the first rotor blade leads relative to the second rotor blade which lags relative to the first rotor blade, thereby controlling the lead-lag motion of the articulated rotor, wherein each rotor blade has at least two lead-lag dampers attached thereto.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

DETAILED DESCRIPTION

Figure 1:
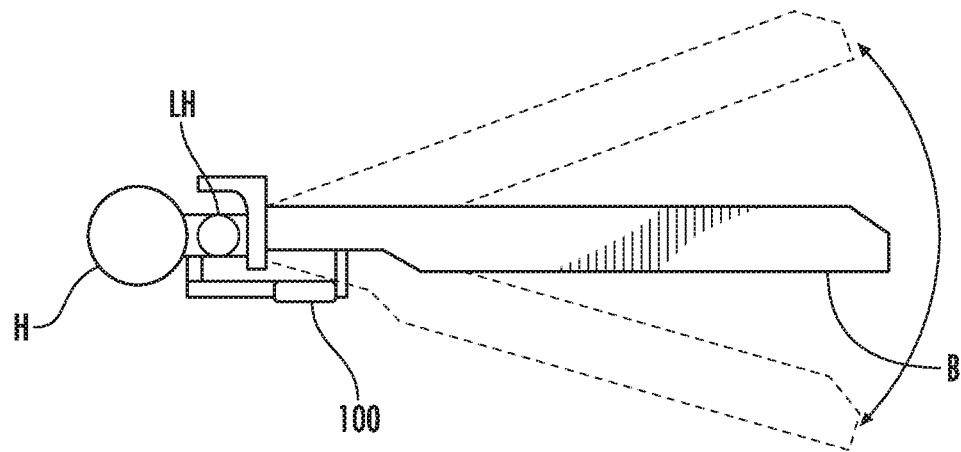
FIG. 1 is a plan view of a portion of an articulated rotor assembly including a lead-lag damper according to an embodiment of the presently disclosed subject matter.

The present subject matter provides systems, devices, and methods for providing lead-lag damping for an articulated rotor (e.g., a helicopter tail rotor). In particular, as shown in FIG. 1, in a configuration substantially similar to conventional lead-lag damper arrangements, a lead-lag damper, generally designated 100, is configured for connection between a rotor hub H and one of a plurality of rotor blades B that is hingedly coupled to rotor hub H by a lag hinge LH (also referred to as a drag hinge). Contrary to conventional lead-lag damper arrangements, however, the presently-disclosed lead-lag damper 100 has a substantially chevron-shaped elastomeric body that provides substantial benefits in both operation and maintainability over conventional cylindrical elastomeric dampers. The lead-lag damper 100, rotor hub H and at least one of a plurality of rotor blades B are collectively referred to as the helicopter rotor assembly and are part of the articulated rotor.

Figure 2:
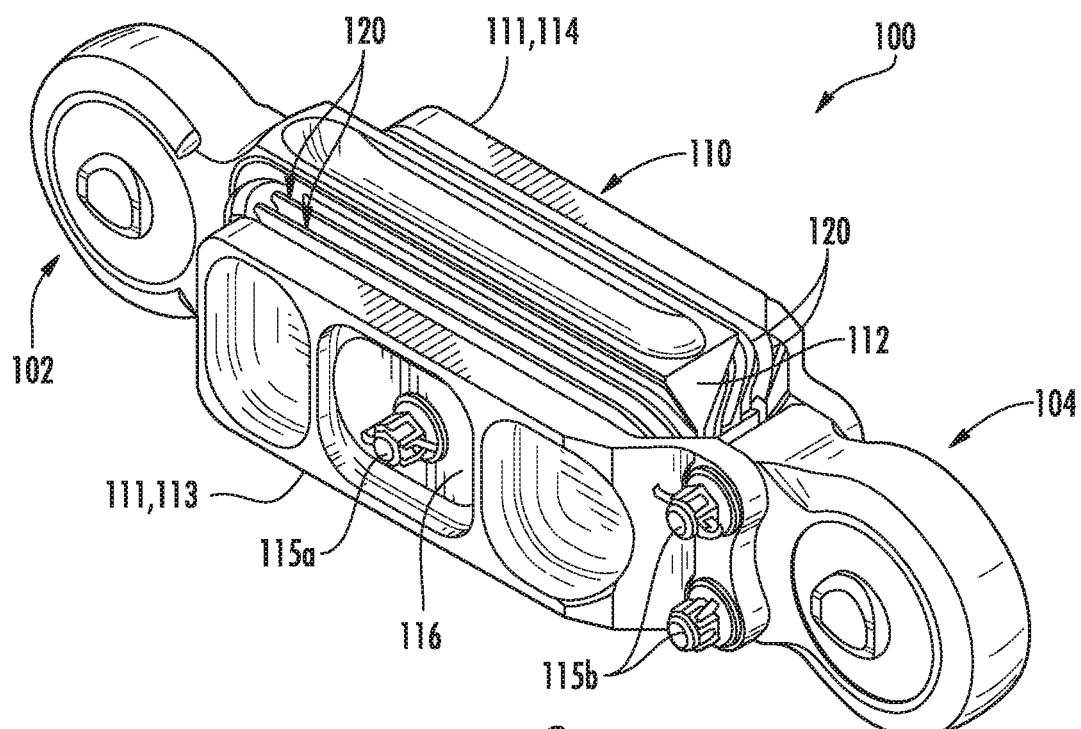
FIG. 2 is a perspective side view of a lead-lag damper according to an embodiment of the presently disclosed subject matter.

In this regard, referring to one particular configuration shown in FIG. 2, lead-lag damper 100 comprises a first end connector 102 configured to be coupled to rotor hub H. In the exemplary configuration illustrated in FIG. 2, first end connector 102 is a first spherical elastomeric bearing that is configured to engage rotor hub H. Alternatively, the first end connector 102 is configured to be coupled to one of a plurality of rotor blades B.

Still referring to FIG. 2, lead-lag damper 100 includes a second end connector 104 configured to be coupled to one of the plurality of rotor blades B. For example, second end connector 104 is a second spherical elastomeric bearing that is configured to engage one of rotor blades B. Alternatively, the second end connector 104 is configured to be coupled to rotor hub H. In other alternate configurations, either or both of first end connector 102 and/or second end connector 104 includes Teflon® or other types of bearing materials that are adapted for the present configurations First end connector 102 and second end connector 104 are configured to couple to either the rotor hub H or to one of the plurality of rotor blades B. Second end connector 104 is configured to couple to either one of the plurality of rotor blades B or to the rotor hub H, whichever is opposite of the coupled first end connector 102.

Between first end connector 102 and second end connector 104, lead-lag damper 100 further includes a body portion 110 coupled to both of first end connector 102 and to second end connector 104. Body portion 110 itself comprises center member 112, second body element 111, which includes outer member 113, 114, and one or more elongated elastomeric material layers 120. The one or more elongated elastomeric material layers 120 that are arranged in their lengthwise directions between first end connector 102 and second end connector 104, each of the elastomeric material layers 120 having a substantially chevron-shaped profile in a crosswise direction (See, e.g., the substantially v-shaped cross-section shown in FIG. 3C). With this configuration, a plurality of such elastomeric material layers 120 are layered together in a stacked arrangement (e.g., such that the chevron-shaped cross-sectional profiles of each nest together on top of one another) to create a desired total thickness of elastomeric material.

Figure 3A:
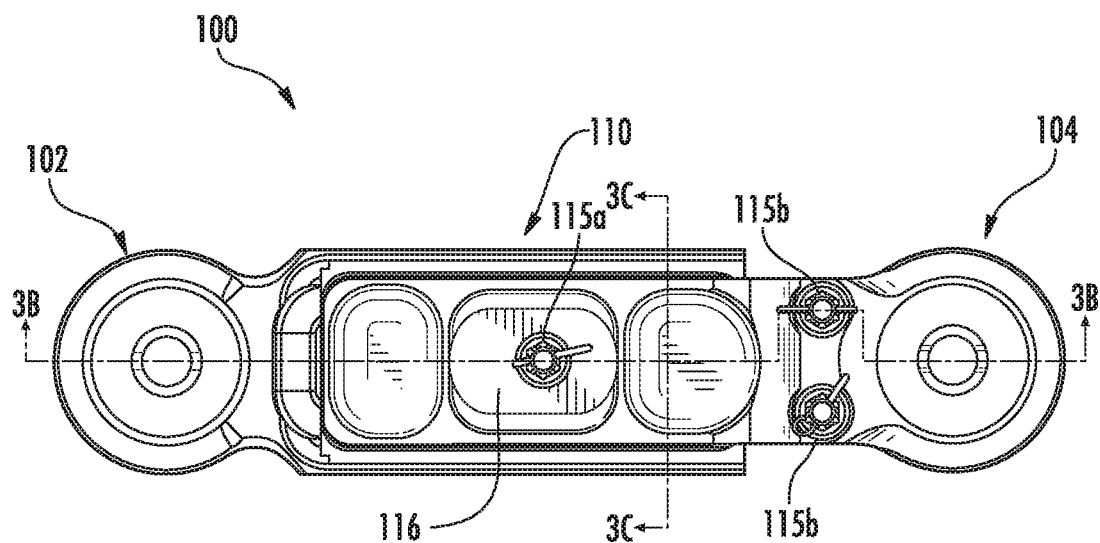
FIG. 3A is a top view of a lead-lag damper according to an embodiment of the presently disclosed subject matter.
Figure 3B:
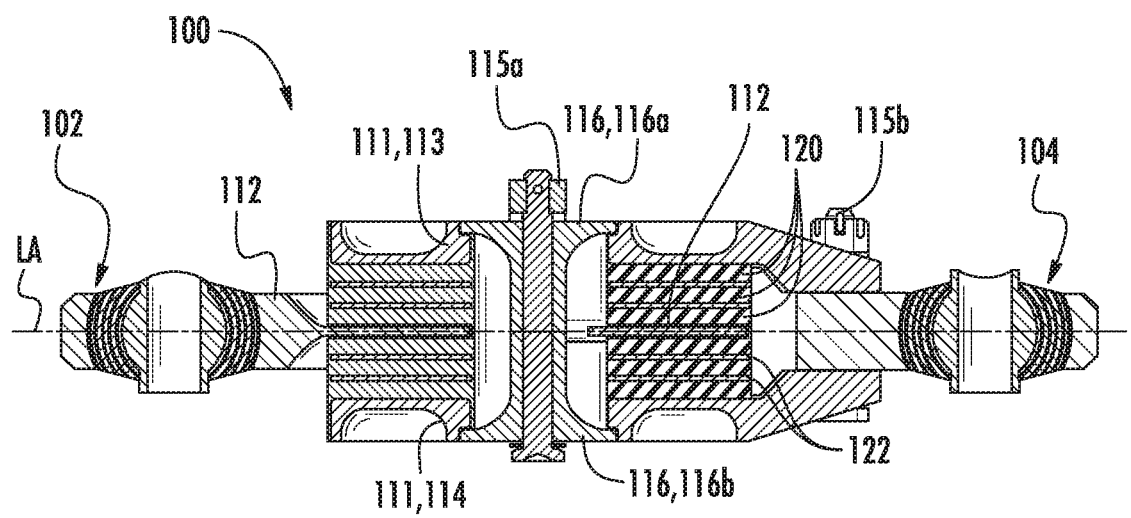
FIG. 3B is a side cross-sectional view taken along line 3B-3B of the lead-lag damper shown in FIG. 3A.
Figure 3C:
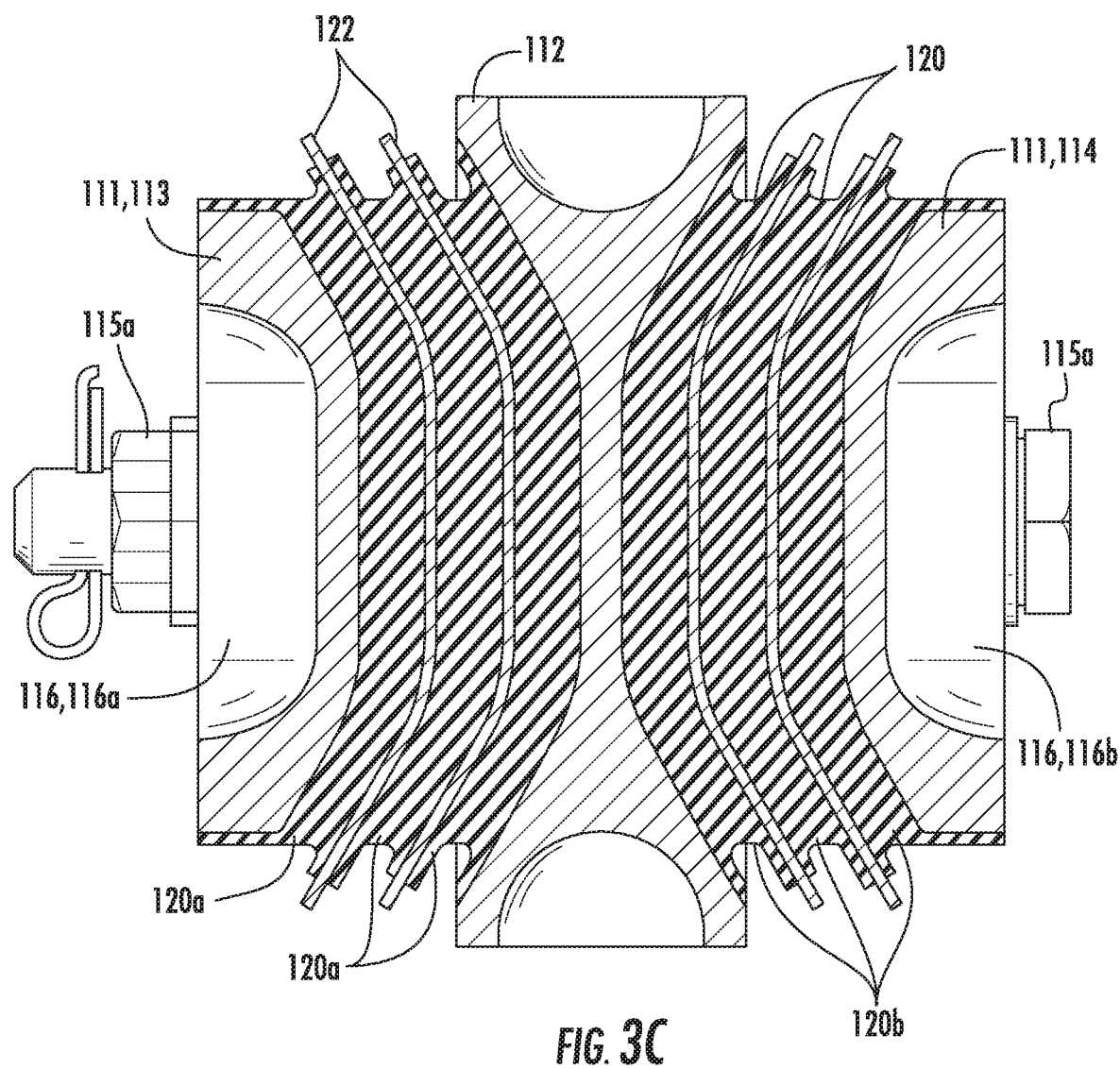
FIG. 3C is an end cross-sectional view taken along line 3C-3C of the lead-lag damper shown in FIG. 3A.
Figure 4:
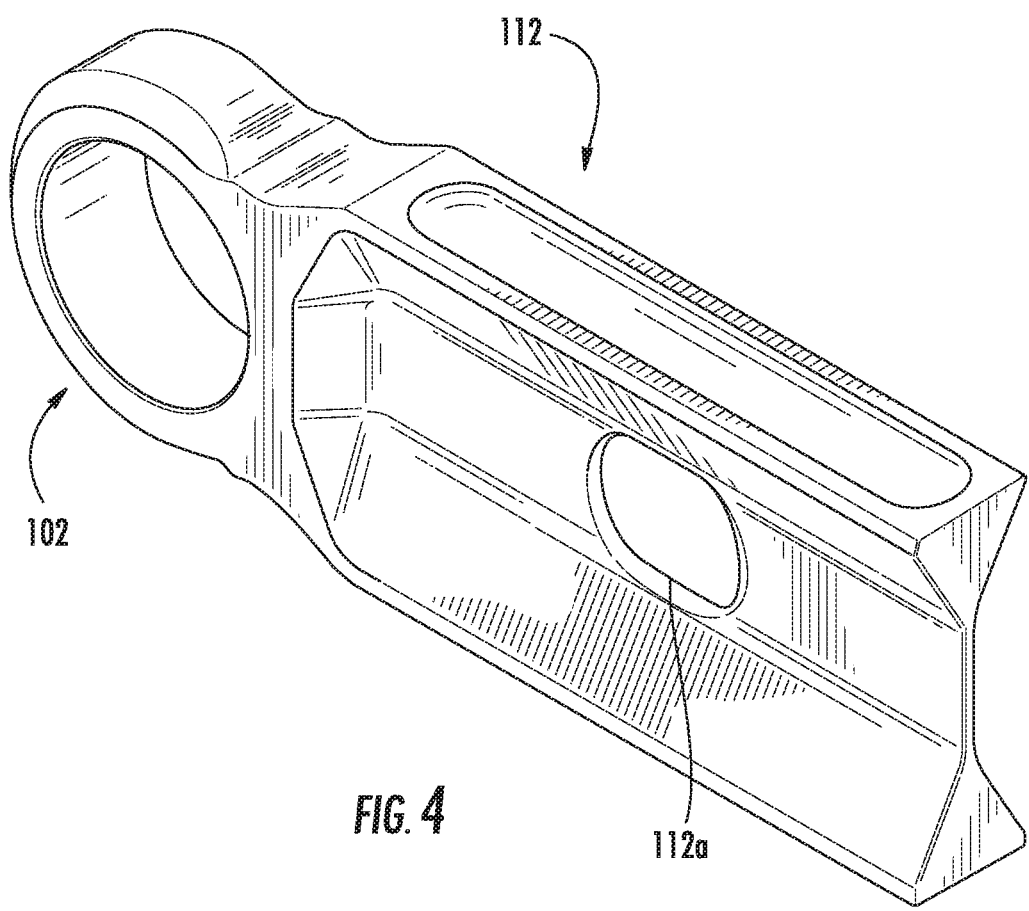
FIG. 4 is a perspective view of the center member.

Referring to FIGS. 2-4, a center member 112 is substantially fixedly connected to the first end connector 102 and a second body element 111 is substantially fixedly connected to the second end connector 104. As illustrated in FIGS. 2-4, and discussed hereinbelow, the one or more elastomeric material layers 120 are secured between the center member 112 and the second body element 111. In one embodiment, the one or more elastomeric material layers 120 are secured between the center member 112 and the second body element 111 by bonding. In this embodiment, center member 112 is bonded to the one or more elastomeric material layers 120 and the second body element 111 is bonded to the one or more elastomeric material layers 120. Alternatively, the one or more elastomeric material layers 120 are secured between the center member 112 and the second body element 111 by at least one or more fasteners 115a, 115b.

Referring to FIG. 3C, elastomeric material layers 120 is illustrated as comprising a first subset 120a of the elastomeric material layers 120 and a second subset 120b of the elastomeric material layers 120. The first subset 120a and second subset 120b of the elastomeric material layers 120 are layered in opposing directions with respect to a center axis of lead-lag damper 100 (i.e., with the substantially chevron-shaped profiles of each group being oriented in opposing directions) to create a geometrically balanced load distribution in the lead-lag direction of lag hinge LH. The center member 112 is positioned between the first subset 120a and the second subset 120b of the elastomeric material layers 120. As illustrated in FIG. 3C, the first subset 120a of the elastomeric material layers 120 positioned on one side of the center member 112 are positioned such that the substantially chevron-shaped profile of each of the first subset 120a of the elastomeric material layers 120 are oriented in a first direction and the second subset 120b of the elastomeric material layers 120 positioned on an opposing side of the center member 112 are positioned such that the substantially chevron-shaped profile of each of the second subset 120*b* of the elastomeric material layers 120 are oriented in a second direction substantially opposing the first direction.

Referring to FIGS. 3B and 3C, back to the embodiment above with the bonding of the one or more elastomeric material layers 120 with the center member 112 and the second body element 111, and to the foregoing discussion regarding the first subset 120*a* and second subset 120*b* of the elastomeric material layers 120, the center member 112 is bonded between the first subset 120*a* and the second subset 120*b* of the elastomeric material layers 120. Additionally, first outer member 113 and second outer member 114 are also bonded to the first subset 120*a* and second subset 120*b* of the elastomeric material layers 120. In an alternative embodiment, center member 112 is bonded between the first subset 120*a* and the second subset 120*b* of the elastomeric material layers 120 and first outer member 113 and second outer member 114 are secured to first subset 120*a* and second subset 120*b* of the elastomeric material layers 120 with fasteners 115*a*, 115*b*.

Referring to FIGS. 3A-4, body portion 110 incorporating such chevron-shaped elastomeric material layers 120 includes center member 112 that is substantially fixedly connected to first end connector 102. Center member 112 is integrally formed with or otherwise fixedly attached to first end connector 102 to effectively transmit forces between first end connector 102 and body portion 110. As shown in FIGS. 3B and 3C, center member 112 extends from first end connector 102 between two of elastomeric material layers 120 (e.g., between the two opposingly-oriented first subset 120*a* and second subset 120*b* of the elastomeric material layers 120).

On the other end of lead-lag damper 100, body portion 110 includes a second body element 111 that is substantially fixedly connected to second end connector 104. Referring to FIGS. 2 and 3A-3C, second body element 111 is comprised of first outer member 113 and a second outer member 114. As illustrated in FIGS. 3A-3C, a first outer member 113 and a second outer member 114 is positioned on opposing sides of elastomeric material layers 120 and connected to second end connector 104. One or more end fastener 115*b* (e.g., a bolt and nut arrangement) is used to securely connect first outer member 113, second outer member 114, and second end connector 104 together.

Referring to FIGS. 2-4, Spacer 116 has a flange, a trunk and a bore. The bore is sized to at least accept fastener 115*a*. The trunk is configured to extend from the flange into the body portion 110. The flange is configured to contact a portion of second body element 111 on either first outer member 113 or second outer member 114. Spacer 116 is illustrated as two spacer sections 116*a*, 116*b*. Spacer 116 is illustrated with two spacer sections 116*a*, 116*b*, but each of the spacer sections 116*a*, 116*b* may be made up of at least two or more elements or segments (not shown) to create the spacer section 116*a*, 116*b*. Spacer sections 116*a*, 116*b*, are illustrated with the trunk of each of the spacer sections 116*a*, 116*b* proximately positioned with the spacer sections 116*a*, 116*b* having a mirrored orientation.

Spacer 116, first outer member 113, second outer member 114 and at least one or more fasteners 115*a* provide for precompression of the one or more elastomeric material layers 120. When assembled, spacer 116 is disposed through center member 112 with spacer sections 116*a*, 116*b* proximately positioned and spacer 116 is secured with at least one or more fasteners 115*a*. In this configuration, the securing one or more fasteners 115*a* exerts force on spacer 116, first outer member 113, second outer member 114 thereby providing for the flange of spacer 116 to exert force on first outer member 113 and second outer member 114. The exertion of force provides for precompressing of the one or more elastomeric material layers 120. The amount of precompression of the one or more elastomeric material layers 120 is predetermined by selecting the height of spacer 116 and the thickness of first outer member 113 and second outer member 114. The height of spacer 116 is also referred to as thickness of spacer 116 when viewed in the context of a thickness of body portion 110.

For all embodiments, body portion 110 has spacer 116 disposed therethrough and secured with one or more body fasteners 115*a*. As stated above, body portion 110 comprises center member 112, second body element 111 (which includes outer member 113, 114) and one or more elongated elastomeric material layers 120 (which includes first subset 120*a* and second subset 120*b*), which are collectively referred to as elements of body portion 110. For the embodiment with all elements of body portion 110 bonded together, center member 112 is bonded to first subset 120*a* and second subset 120*b* of the elastomeric material layers 120, and first outer member 113 and second outer member 114 are bonded to first subset 120*a* and second subset 120*b* of the elastomeric material layers 120. In this bonded configuration, one or more body fastener 115*a* (e.g., a bolt and nut arrangement) secures spacer 116 to first outer member 113 and second outer member 114 such that center member 112, first subset 120*a* and second subset 120*b* positioned therebetween and precompression is applied to first subset 120*a* and second subset 120*b* of the elastomeric material layers 120.

For the embodiments with only center member 112 bonded to first subset 120*a* and second subset 120*b*, or with only first outer member 113 and second outer member 114 bonded to first subset 120*a* and second subset 120*b*, the remaining elements are secured together with fastener 115*a*. With the embodiment of center member 112 bonded to first subset 120*a* and second subset 120*b*, first outer member 113 and second outer member 114 secured to the bonded elements with fastener 115*a* after spacer 116 is disposed therethrough and precompression is applied to first subset 120*a* and second subset 120*b* of the elastomeric material layers 120. With embodiment of first outer member 113 and second outer member 114 bonded to first subset 120*a* and second subset 120*b*, center member 112 is secured to the bonded elements with fastener 115*a* after spacer 116 is disposed therethrough and precompression is applied to first subset 120*a* and second subset 120*b* of the elastomeric material layers 120.

For the embodiment without bonding, center member 112 is proximately positioned adjacent to first subset 120*a* and second subset 120*b*, and first outer member 113 and second outer member 114 are proximately positioned adjacent to first subset 120*a* and second subset 120*b*. Spacer 116 is disposed through the elements of body portion 110 and secured with fastener 115*a* and precompression is applied to first subset 120*a* and second subset 120*b* of the elastomeric material layers 120.

As illustrated in FIGS. 3B and 4, center member 112 has an opening through which spacer 116 is disposed and which provides for a stopping surface 112*a*. Stopping surface 112*a* is designed to contact spacer 116 and prevent longitudinal movement of center member 112 along longitudinal axis LA. If center member 112 resiliently moves longitudinally with respect to first end connector 102 or second end connector 104 as forces generated by the motions of the articulating rotor cause first end connector 102 or second end connector 104 to move towards or away from each other, stopping surface 112a prevents excessive movement of center member upon making contact with spacer 116. The amount of allowable movement allowed by between center member 112 and spacer 116 is predetermined at the time of manufacturing. Any additional movement beyond the allowable movement of center member 112 is excessive and prevented by stopping surface 112a contacting spacer 116.

As discussed above, a total thickness of elastomer in the one or more elastomeric material layers 120 are controllable to adjust the fatigue life of lead-lag damper 100, the area of the one or more elastomeric material layers 120 is selectable to provide a desired stiffness to resist the angular motion of rotor blades B with respect to rotor hub H, and changes in the elastomeric from which elastomeric material layers 120 are formed affect the magnitude of damping provided and loss factor. Further in this regard, in the configuration shown in FIGS. 3B and 3C, one or more metal shims 122 or other stiffeners 122 are provided between adjacent elastomeric material layers 120 to help control the in-plane and out-of-plane stiffness and thus the force response of lead-lag damper 100 with respect to centrifugal loading and moment loading due to torsion and cocking loads on each end of lead-lag damper 100. In this and in other exemplary configurations, elastomeric material layers 120 are precompressed, such as by adjusting the tension applied by body fastener 115a, to further adjust the stress response properties of lead-lag damper 100.

Those having skill in the art will recognize that the use of chevron-shaped elastomeric material layers 120 provide a number of advantages over conventional round elastomeric damper configurations. Such advantages include an increase in a load area oriented in the centrifugal force direction to reach centrifugal force and elastomeric bearing loads (e.g., about 3.66 inches$^2$ versus about 2.00 inches$^2$ +82% for conventional elastomeric dampers or about 23.61 cm$^2$ versus about 12.90 cm$^2$ +82%). In addition, such an arrangement allows the shape factor of lead-lag damper 100 to be increased to better carry centrifugal loading (e.g., 2.73 vs. 2.1 for conventional elastomeric dampers), and the cocking stiffness is increased for a given total elastomer length (e.g., about 3.8 inches versus about 3.68 inches or about 9.65 cm versus about 9.35 cm). In other words, in comparison to conventional damper arrangements in which the elastomer thickness can be divided into at most two layers, lead-lag damper 100 disclosed herein is not limited to two elastomer layers, and thus the shape factor can be increased as necessary (e.g., to include 2, 3, 4, 5 layers or more) to carry centrifugal force and/or other loading. Further, the total number of components in lead-lag damper 100 are reduced relative to conventional designs (e.g., 8 versus 12), and diverging from the conventional cylindrical elastomeric profile eliminates the use of spud and swedge operations that are required to provide precompression of the cylindrical elastomer section of conventional configurations, both factors that improve the manufacturability of lead-lag damper 100 over conventional designs.

The particular chevron-shaped profile enables greater visual exposure of the elastomer in elastomeric material layers 120, which provides for better service inspection. Specifically, elastomer cracks start at the ends of the damper due to overhanging shear strain, which in some situations is considered more detrimental to elastomer life than the direct shear strains on the side of the damper. On a conventional damper having round cross-sectional shapes, the sides are not visible, so the depth of any elastomer cracks is correspondingly not visible. In addition, on a round damper, cracks occur over 180 degrees and are very difficult to see. The depth grows very slowly, but it is impossible to define the depth (without expensive technological or destructive testing). As a result, system maintenance workers often must exercise an overabundance of caution and replace dampers earlier than necessary because of the unknown extent of the material wear.

In contrast, with elastomeric material layers 120 according to the presently-disclosed subject matter having a substantially chevron-shaped profile, the elastomeric material has a larger exposed surface area in the direction of centrifugal loading (e.g., 60% greater area), which makes identification of cracks easier since such cracks generally grow down the side of the elastomer. In addition, by configuring elastomeric material layers 120 to have a substantially chevron-shaped profile, the sides are visible, so it is possible to see the extent of any cracks that develop. Accordingly, the service removal criteria allows for cracks to develop along the side up to a predetermined length, and thus dampers having minimal crack lengths merely requires additional visual inspections until the damper can be replaced at the next maintenance interval. As a result, the need for maintenance and/or replacement becomes more predictable, and parts need not be replaced prematurely, thereby improving the service life of the part.

Referring to FIGS. 3B and 3C, all of the elements of body portion 110 are bonded or secured together to securely yet elastically couple lead-lag damper 100 between rotor hub H and a respective one of rotor blades B. As discussed above, preferably, all of the elements of body portion 110 are bonded together, but an alternate embodiment provides for some of the elements of body portion 110 to be bonded together with the remaining elements secured to the bonded elements using fasteners 115a, 115b. In another alternate embodiment, all of the elements of body portion 110 are secured together using fasteners 115a, 115b.

In a first orientation with first end connector 102 attached to rotor hub H and second end connector 104 attached to rotor blade B, any relative lead or lag motion of the respective one of rotor blades B causes a force to be transmitted from second end connector 104 through first and second outer members 113, 114 to elastomeric material layers 120, which dampens at least a portion of the generated force. The reduced force is further received at rotor hub H from elastomeric material layers 120 through center member 112. In this way, although each of rotor blades B is allowed to rotate about lag hinge LH to accommodate the natural lead and lag of rotor blades B as they rotate, the extent of this motion is carefully regulated by the properties of lead-lag damper 100.

In a second orientation with first end connector 102 attached to rotor blade B and second end connector 104 attached to rotor hub H, any relative lead or lag motion of the respective one of rotor blades B causes a force to be transmitted from first end connector 102 through center member 112 to elastomeric material layers 120, which dampens at least a portion of the generated force. The reduced force is further received at rotor hub H from elastomeric material layers 120 through first and second outer members 113 and 114 to second end connector 104. In this way, although each of rotor blades B is allowed to rotate about lag hinge LH to accommodate the natural lead and lag of rotor blades B as they rotate, the extent of this motion is carefully regulated by the properties of lead-lag damper 100.

Referring to FIGS. 1-4, in one embodiment for a rotor-to-hub configuration, a method for controlling lead-lag motion of an articulated rotor is provided. A helicopter rotor assembly of the articulated rotor is provided. The helicopter rotor assembly comprises rotor hub H, at least one or more rotor blades B hingedly coupled to the rotor hub H by a lag hinge LH (also referred to as a drag hinge), and a lead-lag damper 100. The lead-lag damper 100 is connected between the rotor hub H and the at least one or more rotor blades B. The method includes coupling either the first end connector 102 or the second end connector 104 of the lead-lag damper 100 to the rotor hub H. The method includes coupling either the second end connector 104 or the first end connector 102 of the lead-lag damper 100, whichever of the first end connector 102 or second end connector 104 is not already coupled, to one of a plurality of rotor blades B hingedly coupled to the rotor hub H. The method includes rotating the helicopter rotor assembly such that a first rotor blade B leads relative to the rotor hub H and the second rotor blade B lags relative to the rotor hub H, thereby controlling the lead-lag motion of the articulated rotor. In the rotor-to-hub configuration, the method further comprises connecting a single lead-lag damper 100 between each of the rotor blades B and the rotor hub H.

Referring to FIGS. 1-4, in an alternative blade-to-blade configuration, a method for controlling lead-lag motion of an articulated rotor is provided. A helicopter rotor assembly of the articulated rotor is provided. The helicopter rotor assembly comprises rotor hub H, at least two or more rotor blades B hingedly coupled to the rotor hub H by a lag hinge LH (also referred to as a drag hinge), and a lead-lag damper 100 connected between two of the rotor blades B. The method includes coupling either the first end connector 102 or a second end connector 104 of a lead-lag damper 100 to a first rotor blade B. The method includes coupling either the second end connector 104 or the first end connector 102 of the lead-lag damper 100, whichever of the first end connector 102 or second end connector 104 is not already coupled, to a second rotor blade B. The method includes rotating the helicopter rotor assembly such that the first rotor blade B leads relative to the second rotor blade B which lags relative to the first rotor blade B, thereby controlling the lead-lag motion of the articulated rotor, wherein each rotor blade B has at least two lead-lag dampers 100 attached thereto. In the blade-to-blade configuration, the method further comprises connecting a single lead-lag damper 100 between each of the two or more rotor blades B, such that each of the rotor blades has a lead-lag damper 100 acting between them. For example, in a three (3) rotor blade B configuration there will be one (1) lead-lag damper 100 between each of the rotor blades B. Stated otherwise, there is one (1) lead-lag damper 100 between the first and second rotor blades B, one (1) lead-lag damper 100 between the second and third rotor blades B, and one (1) lead-lag damper 100 between the third and first rotor blades B. The number of lead-lag dampers 100 is equal to the number of rotor blades B.

Referring to FIGS. 1-4, in either the blade-to-hub configuration or the blade-to-blade configuration the method further comprises coupling the body portion 110 of the lead-lag damper 100 to the first end connector 102 and to the second end connector 104. In this method, the body portion 110 comprises one or more elastomeric material layers 120 arranged in a lengthwise direction between the first end connector 102 and the second end connector 104, each of the elastomeric material layers 120 having a substantially chevron-shaped profile in a crosswise direction. The coupling of the body portion 110 of the lead-lag damper 100 to the first end connector 102 and to the second end connector 104 includes substantially fixedly connecting the center member 112 to the first end connector 102; substantially fixedly connecting the second body element 111 to the second end connector 104; and securing the one or more elastomeric material layers 120 between the center member 112 and the second body element 111.

Referring to FIGS. 1-4, in either the blade-to-hub configuration or the blade-to-blade configuration the method further comprises securing the one or more elastomeric material layers 120 between the center member 112 and the second body element 111 includes bonding the center member 112 to the one or more elastomeric material layers 120 and bonding the second body element 111 to the one or more elastomeric material layers 120. Alternatively, the method further comprises securing the one or more elastomeric material layers 120 between the center member 112 and the second body element 111 together with one or more fasteners 115a, 115b when the center member 112, the one or more elastomeric material layers 120, and the second body element 111 are positioned proximate to each other. In the alternative embodiment, the step of securing the one or more elastomeric material layers 120 between the center member 112 and the second body element 111 further includes the second body element 111 having plurality of outer members 113, 114 positioned on opposing sides of the one or more elastomeric material layers 120.

Referring to FIGS. 1-4, in either the blade-to-hub configuration or the blade-to-blade configuration the method further comprises pre-compressing the one or more elastomeric material layers 120 by securing the spacer 116 and the outer members 113, 114 with at least one fastener 115a, each spacer 116 having a predetermined thickness associated therewith and the outer members 113, 114 having a thickness associated therewith. The combination of the spacer 116 with the predetermined thickness and the outer members 113, 114 having a thickness are combined to provide for selectively pre-compressing the one or more elastomeric material layers 120. The method further comprises providing additional precompression of the one or more elastomeric material layers 120 by securing the second end connector 104 with outer members 113, 114 using one or more fasteners 115b, wherein the second end connector 104 has a width and the combination of the thickness of outer members 113, 114 with the width of second end connector 104 provides for the further precompression of the one or more elastomeric material layers 120 when the second end connector 104 and outer members 113, 114 are secured by the one or more fasteners 115b.

Still referring to FIGS. 1-4, the method further comprises providing the spacer 116 having at least two spacer sections 116a, 116b. In one embodiment, the method further comprises providing the spacer sections 116a, 116b wherein each spacer section 116a, 116b is comprised of at least two elements (not shown).

Referring to FIGS. 2-4, the method further comprises providing a method to stop longitudinal movement of the center member 112 along the longitudinal axis LA by having the spacer 116 being configured to stop movement of center member 112 along stopping surface 112a.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A lead-lag damper for an articulated helicopter rotor comprising:

a first end connector capable of being coupled to either a rotor hub or to one of a plurality of rotor blades;

a second end connector capable of being coupled to either to one of the plurality of rotor blades or to the rotor hub, whichever is opposite of the first end connector coupled to either to one of the plurality of rotor blades or to the rotor hub; and a body portion comprising a first end coupled to the first end connector and a second end coupled to the second end connector, the body portion comprising six or more elongated elastomeric material layers that are each arranged in a lengthwise direction between the first end and the second end, each of the six or more elastomeric material layers all having a chevron-shaped profile in a cross-section perpendicular to the lengthwise direction, wherein a first subset comprising at least three or more of the six or more elastomeric material layers have the chevron-shaped profile and are positioned to mirror a second subset comprising at least three or more of the six or more elastomeric material layers which also have the chevron-shaped profile, wherein the body portion comprises:

a center member fixedly connected to the first end connector and extending between the first subset and the second subset in the lengthwise direction toward the second end connector;

a second body element fixedly connected to the second end connector and extending in the lengthwise direction toward the first end connector; and wherein the first subset and the second subset are secured between the center member and the second body element; and wherein at least the first subset or the second subset is arranged in a stacked arrangement in a crosswise direction perpendicular to the lengthwise direction in which the chevron-shaped profile of each of the first subset or the second subset is nested together in the crosswise direction.

2. The lead-lag damper of claim 1, wherein the second body element comprises a plurality of outer members positioned on opposing sides of the six or more elastomeric material layers.

3. The lead-lag damper of claim 2, wherein the plurality of outer members are connected to a respective one of the first end connector or the second end connector by one or more fasteners.

4. The lead-lag damper of claim 1, wherein the center member is bonded to an inner layer of the first subset and an inner layer of the second subset, and the second body element is bonded to an outer layer of the first subset and an outer layer of the second subset.

5. The lead-lag damper of claim 1, comprising one or more fasteners securing the center member, the first subset, the second subset, and the second body element together when the center member, the first subset, the second subset, and the second body element are positioned together.

6. The lead-lag damper of claim 1, comprising one or more fasteners provide for precompression of the first subset and the second subset.

7. The lead-lag damper of claim 6, further comprising a spacer associated with at least one fastener of the one or more fasteners, the spacer having a predetermined thickness associated therewith, wherein the second body element has a thickness, and wherein a combination of the predetermined thickness of the spacer and the thickness of the second body element are combined to provide for pre-compressing the first subset and the second subset when the spacer and the second body element are secured by the one or more fasteners.

8. The lead-lag damper of claim 7, wherein the spacer is comprised of at least two spacer sections.

9. The lead-lag damper of claim 7, wherein the spacer is positioned to stop longitudinal movement of the center member along a longitudinal axis.

10. The lead-lag damper of claim 7, wherein the second end connector has a width and a combination of the thickness of the second body element with the width of the second end connector provides for further precompression of the first subset and the second subset when the second end connector and the second body element are secured by the one or more fasteners.

11. The lead-lag damper of claim 1, wherein the body portion comprises one or more metal shims positioned between each adjacent elastomeric material layer in the first subset and the second subset.

12. A helicopter rotor assembly including the lead-lag damper of claim 1, the helicopter rotor assembly further comprising:

a rotor hub;

one or more rotor blades hingedly coupled to the rotor hub;

wherein the lead-lag damper is connected between the rotor hub and one of the one or more rotor blades, wherein the first end connector is coupled to either the rotor hub or to one of the one or more rotor blades, and the second end connector is coupled to either one of the one or more rotor blades or to the rotor hub, whichever is oppositely connected from the first end connector.

* * * * *